United States Patent
Chen et al.

(10) Patent No.: US 12,524,081 B2
(45) Date of Patent: Jan. 13, 2026

(54) LIGHT EMITTING DEVICE AND KEYBOARD STRUCTURE

(71) Applicant: LITE-ON TECHNOLOGY CORPORATION, Taipei (TW)

(72) Inventors: Shan-Hui Chen, Taoyuan (TW); Po-Jui Lin, New Taipei (TW); Chang-Hung Hsieh, New Taipei (TW); Po-Cheng Hsu, New Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 298 days.

(21) Appl. No.: 18/224,606

(22) Filed: Jul. 21, 2023

(65) Prior Publication Data
US 2024/0028134 A1    Jan. 25, 2024

Related U.S. Application Data

(60) Provisional application No. 63/406,735, filed on Sep. 15, 2022, provisional application No. 63/391,072, filed on Jul. 21, 2022.

(30) Foreign Application Priority Data

Apr. 13, 2023    (CN) .......................... 202310392214.7

(51) Int. Cl.
G06F 3/02    (2006.01)
H05K 1/11    (2006.01)
H05K 1/18    (2006.01)

(52) U.S. Cl.
CPC ............ G06F 3/0202 (2013.01); H05K 1/111 (2013.01); H05K 1/18 (2013.01); *G06F 2203/01* (2013.01);
(Continued)

(58) Field of Classification Search
CPC ...... G06F 2203/01; G06F 3/0202; G06F 3/02; H05K 1/111; H05K 1/113; H05K 1/18;
(Continued)

(56) References Cited

U.S. PATENT DOCUMENTS

2016/0003450 A1*   1/2016   Lee ..................... G02B 19/0014
                                                              362/268
2017/0324011 A1*  11/2017   Hwang .............. H10H 20/8515
(Continued)

FOREIGN PATENT DOCUMENTS

TW    201137910 A1    11/2011
TW    201939544 A     10/2019

*Primary Examiner* — Timothy J Thompson
*Assistant Examiner* — Guillermo J Egoavil
(74) *Attorney, Agent, or Firm* — Li & Cai Intellectual Property (USA) Office

(57) ABSTRACT

A light emitting device and a keyboard structure are provided. The light emitting device includes a circuit board and multiple light emitting units. The circuit board includes a substrate, a first conductive pad, multiple second conductive pads, and multiple third conductive pads. The first conductive pad and the second conductive pads are disposed on a first board surface of the substrate. The first conductive pad has a symmetrical shape and a symmetrical axis. The symmetrical axis passes through the second conductive pads. The third conductive pads are disposed on a second board surface of the substrate. Each of the third conductive pads is electrically coupled to the first conductive pad and the second conductive pads by multiple conductive columns. Each of the light emitting units is connected to the first conductive pad and one of the second conductive pads.

12 Claims, 15 Drawing Sheets

(52) U.S. Cl.
CPC .............. *H05K 2201/09372* (2013.01); *H05K 2201/09909* (2013.01); *H05K 2201/10083* (2013.01); *H05K 2201/10121* (2013.01); *H05K 2201/2054* (2013.01)

(58) Field of Classification Search
CPC ..................... H05K 1/181; H05K 1/11; H05K 2201/09227; H05K 2201/09372; H05K 2201/09909; H05K 2201/10083; H05K 2201/10106; H05K 2201/10121; H05K 2201/2054
USPC ......................................................... 361/748
See application file for complete search history.

(56) References Cited

U.S. PATENT DOCUMENTS

2020/0357967 A1\* 11/2020 Oh ....................... H10H 20/857
2021/0098210 A1 4/2021 Wu et al.

\* cited by examiner

LIGHT EMITTING DEVICE AND KEYBOARD STRUCTURE

CROSS-REFERENCE TO RELATED PATENT APPLICATION

This application claims the benefit of priorities to China Patent Application No. 202310392214.7, filed on Apr. 13, 2023 in People's Republic of China, and U.S. Provisional Patent Application Ser. No. 63/406,735 filed on Sep. 15, 2022, and No. 63/391,072 filed on Jul. 21, 2022. The entire content of each of the above identified applications is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a device and a structure, and more particularly to a light emitting device and a keyboard structure.

BACKGROUND OF THE DISCLOSURE

A conventional keyboard structure includes a light emitting device, and a plurality of light emitting units of the light emitting device are electrically coupled to a circuit. During a manufacturing process of the conventional light emitting device, the circuit on a substrate is formed by solidifying a molten conductive material (e.g., solder). However, when the molten conductive material is not yet solidified, each of the light emitting units located on the molten conductive material is prone to rotation and displacement, which leads to unreliable electrical coupling between the light emitting units and the circuit. Additionally, during the solidification process, the molten conductive material is susceptible to uneven distribution due to cohesive forces, such that some areas of the circuit are thinner and prone to breakage.

SUMMARY OF THE DISCLOSURE

In response to the above-referenced technical inadequacies, the present disclosure provides a light emitting device and a keyboard structure.

In order to solve the above-mentioned problems, one of the technical aspects adopted by the present disclosure is to provide a light emitting device. The light emitting device includes a circuit board and a plurality of light emitting units. The circuit board includes a substrate, a first conductive pad, a plurality of second conductive pads, and a plurality of third conductive pads. The substrate has a first board surface and a second board surface that is opposite to the first board surface. The first conductive pad is disposed on the first board surface. The first conductive pad has a symmetrical shape and a symmetrical axis. The second conductive pads are disposed on the first board surface. The symmetrical axis passes through the second conductive pads, and the second conductive pads are spaced apart from the first conductive pad. The third conductive pads are disposed on the second board surface. The third conductive pads are electrically coupled to the first conductive pad and the second conductive pads respectively by a plurality of conductive columns. The light emitting units are disposed on the first board surface. Each of the light emitting units is connected to the first conductive pad and one of the second conductive pads.

In one of the possible or preferred embodiments, a longitudinal axis of each of the light emitting units is parallel to the symmetrical axis.

In one of the possible or preferred embodiments, the first conductive pad includes a plurality of conductive sheets and a connecting circuit line. The conductive sheets are spaced apart from each other. The symmetrical axis passes through the conductive sheets, and the conductive sheets are respectively connected to the light emitting units. The connecting circuit line is connected to the conductive sheets.

In one of the possible or preferred embodiments, an area of each of the conductive sheets is equal to an area of each of the second conductive pads.

In one of the possible or preferred embodiments, a part of the connecting circuit line has a ring pattern and surrounds one of the second conductive pads.

In one of the possible or preferred embodiments, the light emitting device further includes two insulating layers. The two insulating layers are respectively disposed on two sides of the first board surface, and are symmetrically to the symmetrical axis, and the two insulating layers cover a part of the first conductive pad.

In one of the possible or preferred embodiments, the light emitting device further includes two insulating layers that cover a part of the first conductive pad. Two of the second conductive pads farthest from each other have a farthest distance there-between, two side portions of the connecting circuit line are parallel to the symmetrical axis, a length of each of the two side portions is greater than or equal to the farthest distance, and a length of each of the two insulating layers is greater than or equal to the length of each of the two side portions.

In one of the possible or preferred embodiments, heights of the two insulating layers relative to the substrate are identical to each other.

In one of the possible or preferred embodiments, the light emitting device further includes a diffusion layer disposed on the first board surface. The diffusion layer covers the light emitting units.

In one of the possible or preferred embodiments, the light emitting device further includes a reflective layer that covers the diffusion layer.

In one of the possible or preferred embodiments, the light emitting device further includes two light blocking walls. The two light blocking walls are respectively disposed on two sides of the light emitting units, and each of the two light blocking walls is parallel to the symmetrical axis.

In order to solve the above-mentioned problems, another one of the technical aspects adopted by the present disclosure is to provide a keyboard structure. The keyboard structure includes the above-mentioned light emitting device, a keycap that covers the light emitting device, and a carrier that carries the light emitting device and the keycap. The light emitting device corresponds in position to a center of the keycap, and a longitudinal axis of the light emitting device is parallel to a width direction of a character on the keycap.

Therefore, in the light emitting device and the keyboard structure provided by the present disclosure, by virtue of "the first conductive pad having a symmetrical shape and a symmetrical axis" and "the symmetrical axis passing through the second conductive pads, and the second conductive pads being spaced apart from the first conductive pad," the light emitting device and the keyboard structure can ensure an electrical relationship between the light emitting units, and the first conductive pad, the second conductive pads, and the third conductive pads connected, so as to improve product reliability.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
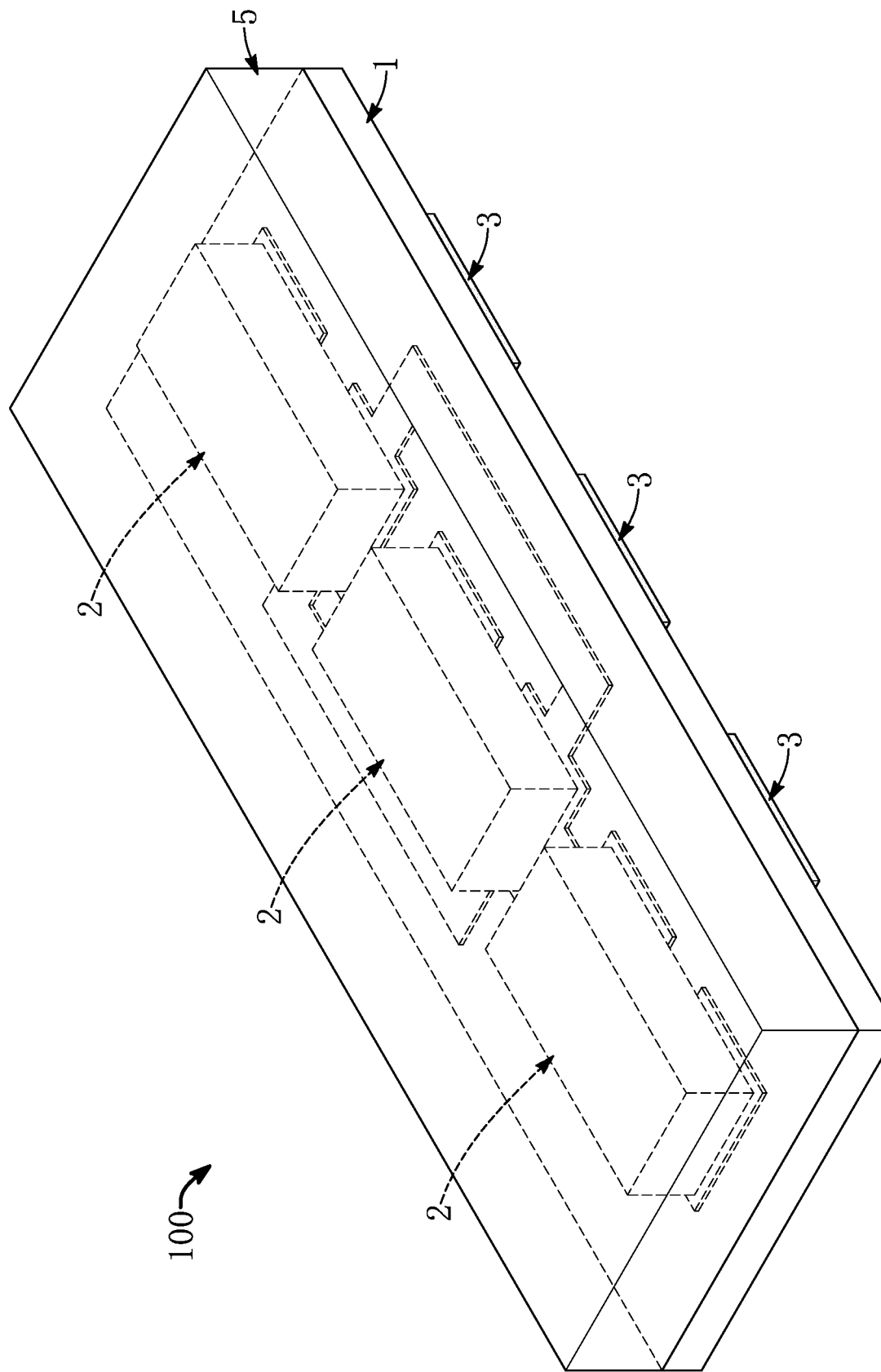
FIG. 1 is a schematic perspective view of a light emitting device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
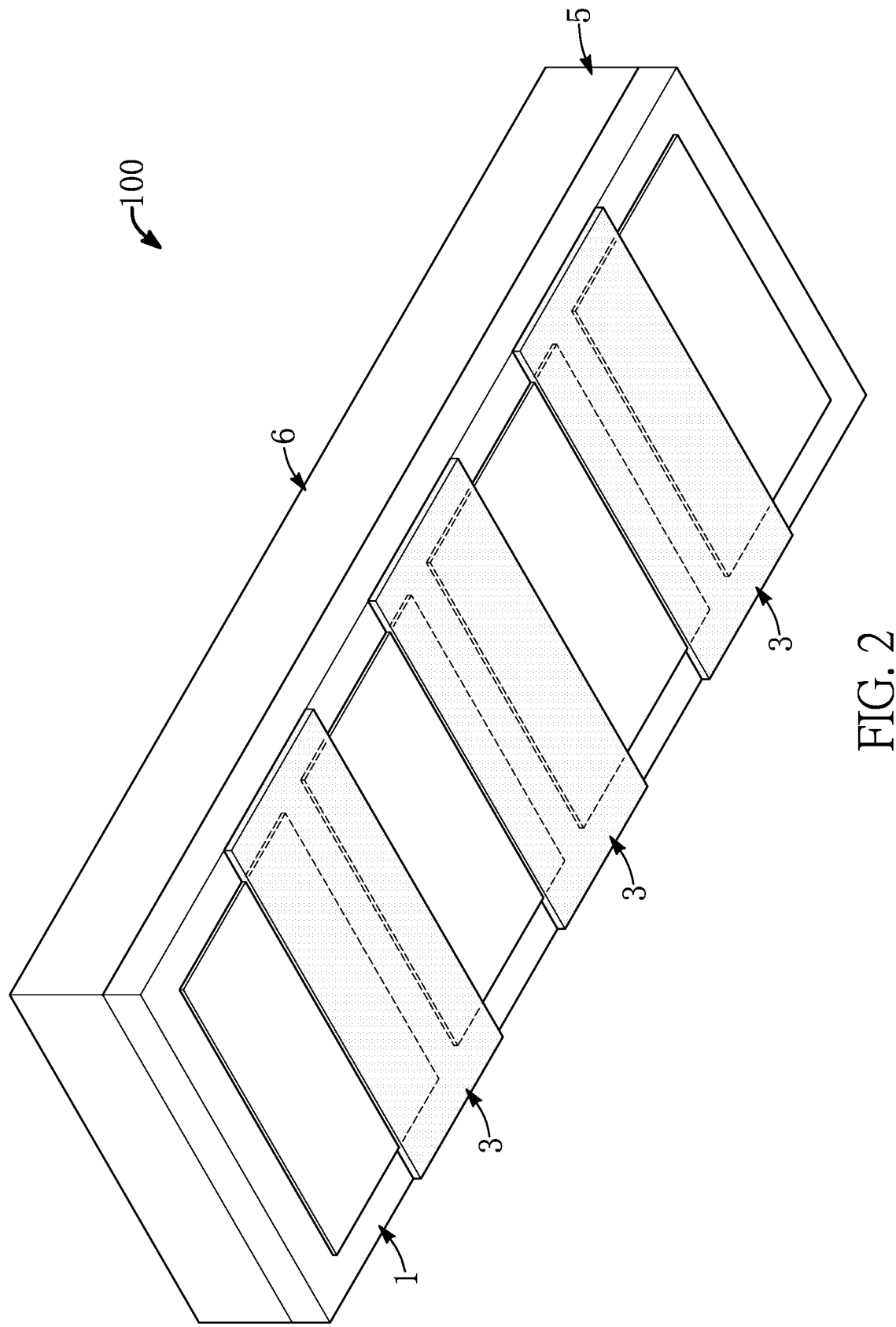
FIG. 2 is another schematic perspective view of the light emitting device according to the first embodiment of the present disclosure.

Referring to FIG. 1 to FIG. 6, a first embodiment of the present disclosure provides a light emitting device 100. As shown in FIG. 1 and FIG. 2, the light emitting device 100 includes a circuit board 1 and a plurality of light emitting units 2 that are disposed on the circuit board 1. The following description describes the structure and connection relation of each component of the light emitting device 100.

Figure 3:
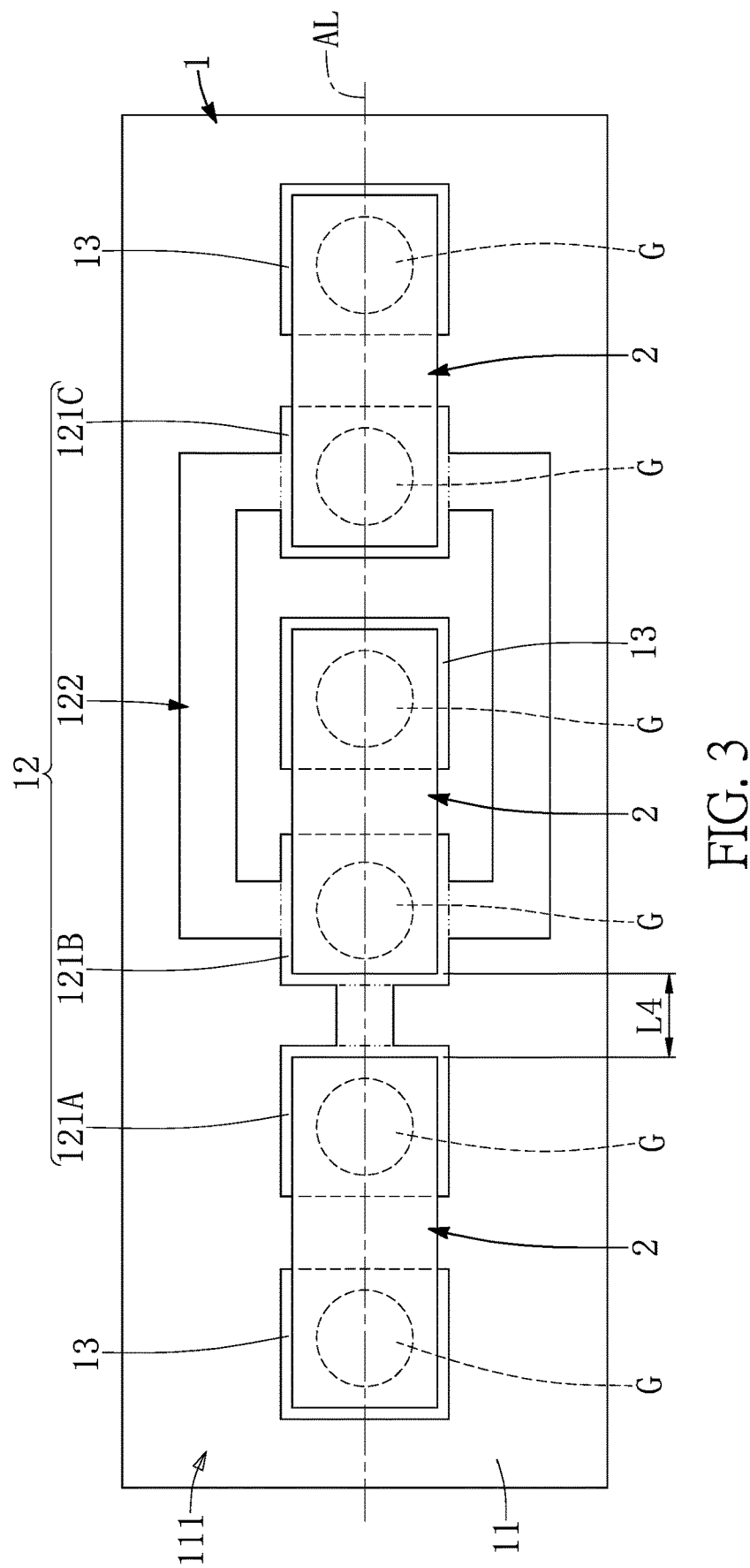
FIG. 3 is a schematic top view of the light emitting device according to the first embodiment of the present disclosure, with a plurality of light blocking walls, a diffusion layer, and a reflective layer being omitted.
Figure 5:
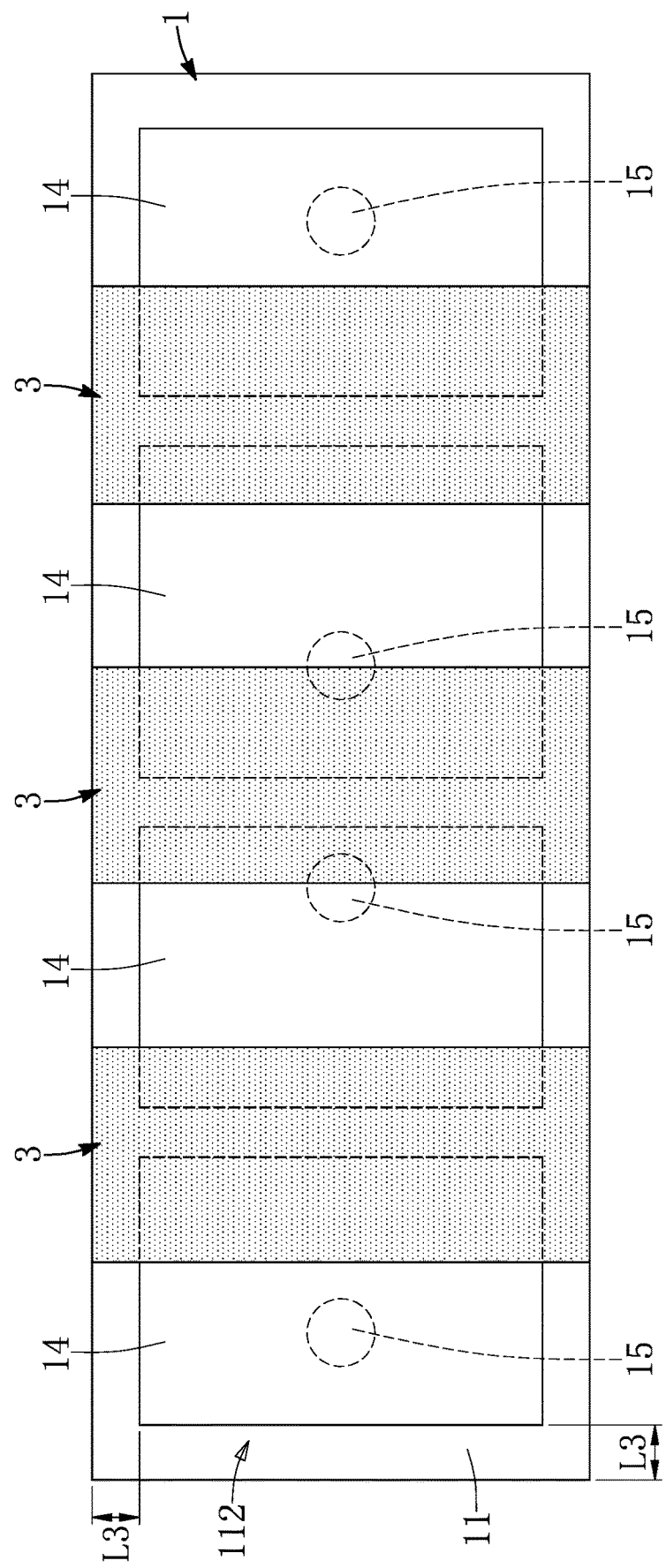
FIG. 5 is a schematic bottom view of the light emitting device according to the first embodiment of the present disclosure.

Referring to FIG. 3 and FIG. 5, the circuit board 1 includes a substrate 11, and a first conductive pad 12, a plurality of second conductive pads 13, and a plurality of third conductive pads 14 that are disposed on the substrate 11. The substrate 11 in the present embodiment is a rectangular plate structure, and the substrate 11 has two wide side surfaces opposite to each other and four narrow side surfaces that are connected to the two wide side surfaces, but the present disclosure is not limited thereto. For convenience of subsequent description, the two wide side surfaces are respectively defined as a first board surface 111 and a second board surface 112. That is, the first board surface 111 and the second board surface 112 are located on opposite sides of the substrate 11.

Figure 4:
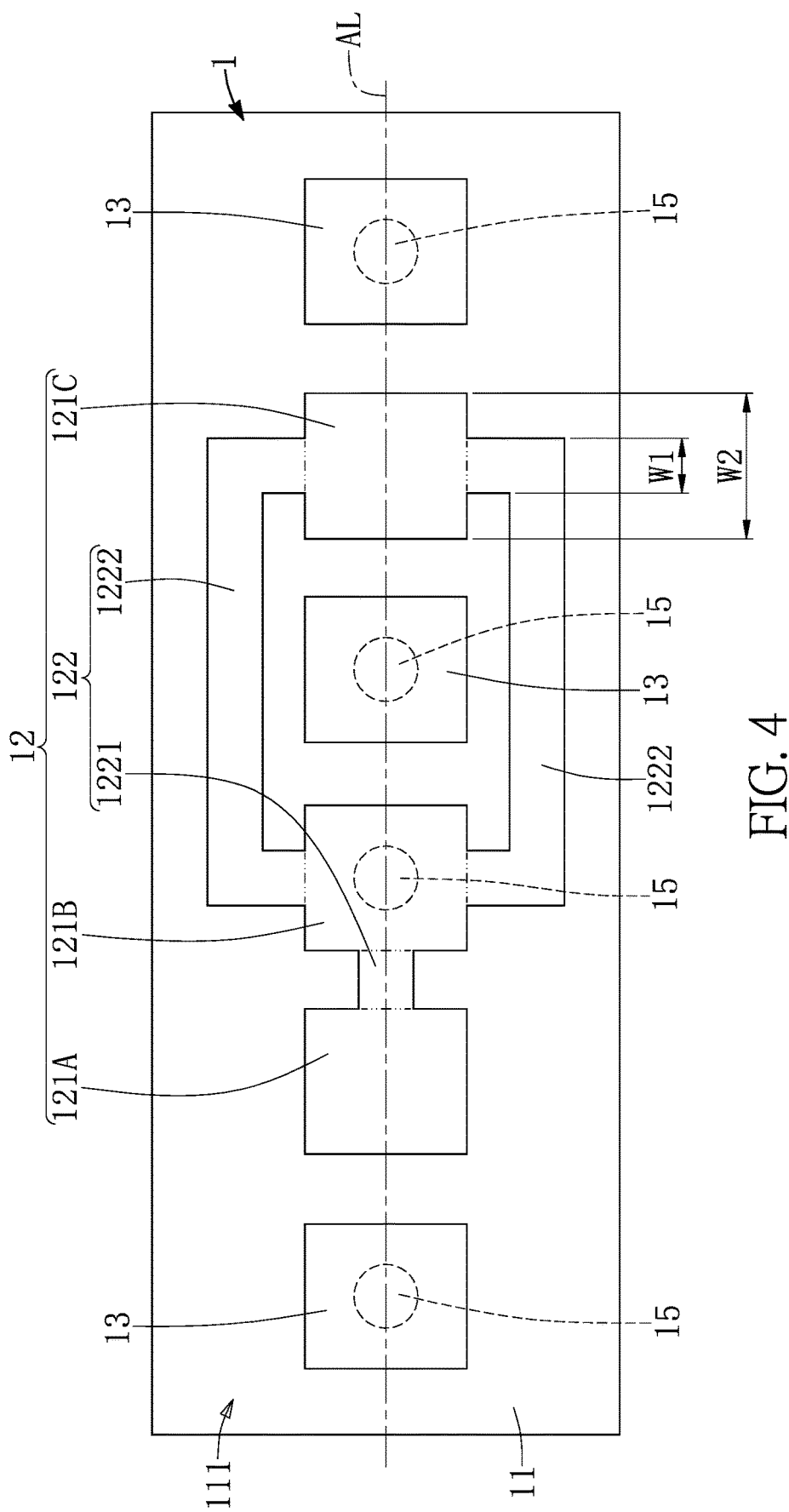
FIG. 4 is a schematic top view of the light emitting device according to the first embodiment of the present disclosure, with a plurality of light emitting units, the light blocking walls, the diffusion layer, and the reflective layer being omitted.

Referring to FIG. 3 and FIG. 4, the first conductive pad 12 is disposed on the first board surface 111, and the first conductive pad 12 can provide a first polarity (e.g., a positive polarity) for electrical coupling to the light emitting units 2. In detail, the first conductive pad 12 is in a symmetrical shape and has a symmetrical axis AL. In the present embodiment, the symmetrical axis AL of the first conductive pad 12 substantially overlaps with a longitudinal axis of the first board surface 111, and the first conductive pad 12 includes a plurality of conductive sheets (i.e., 121A, 121B, 121C in FIG. 4) and a connecting circuit line 122 that is connected to the conductive sheets. In certain embodiments (not particularly shown), the longitudinal axis of the first board surface 111 may not overlap with the symmetrical axis AL of the first conductive pad to accommodate other practical requirements.

The conductive sheets have a rectangular shape and are spaced apart from each other, but the present disclosure is not limited thereto (e.g., each of the conductive sheets can also have a circular shape or other geometric shapes). The conductive sheets can be arranged along the longitudinal axis of the first board surface 111, such that the symmetrical axis AL passes through each of the conductive sheets. The conductive sheets are respectively connected to the light emitting units 2. In addition, the connecting circuit line 122 is connected to the conductive sheets, so that the first conductive pad 12 can have the first polarity.

In one embodiment of the present disclosure, the connecting circuit line 122 may have a plurality of connection segments (e.g., 1221, 1222 in FIG. 4), and a width W1 of each of the connection segments is smaller than a width W2 of each of the conductive sheets, so that a flow area of solder material G (e.g., tin) can be limited by the width W1 of each of the connection segments, and a soldering width of each of the light emitting units 2 can be limited by the width W2 of each of the conductive sheets. However, it should be noted that the present disclosure is not limited to this specific width relationship.

Taking the light emitting device 100 illustrated in FIG. 4 as an example, a first connection segment 1221 is capable of connecting a first conductive sheet 121A and a second conductive sheet 121B. Two second connection segments 1222 are respectively a U-shaped structure and an inverted U-shaped structure, and the two second connection segments 1222 are symmetrically connected to the second conductive sheet 121B and a third conductive sheet 121C along the symmetrical axis AL, so that the two second connection segments 1222, the second conductive sheet 121B, and the third conductive sheet 121C roughly form a ring pattern. Therefore, the connecting circuit line 122 cooperates with the conductive sheets to form the symmetrical shape.

Referring to FIG. 3 and FIG. 4, the second conductive pads 13 are disposed on the first board surface 111, and each of the second conductive pads 13 can provide a second polarity (e.g., a negative polarity) that is opposite to the first polarity for electrical coupling to the light emitting units 2. Specifically, in the present embodiment, each of the second conductive pads 13 has a rectangular shape, and the second conductive pads 13 are spaced apart from each other. Each of the second conductive pads 13 is arranged substantially along the longitudinal axis of the first board surface 111, so that the symmetrical axis AL can pass through the second conductive pads 13. However, the present disclosure is not limited thereto. For example, in another embodiment of the present disclosure (not shown), each of the second conductive pads 13 can also have a circular shape or other geometric shapes, and the second conductive pads 13 are not arranged along the longitudinal axis of the first board surface 111 (e.g., the longitudinal axis does not overlap with the symmetrical axis AL).

It is worth noting that one of the second conductive pads 13 can be surrounded by the ring pattern (i.e., the two second connection segments 1222, the second conductive sheet 121B, and the third conductive sheet 121C), so that a space on the first board surface 111 is effectively utilized. In addition, it is preferable for an area of each of the second conductive pads 13 to be substantially equal to an area of each of the conductive sheets 121, but the present disclosure is not limited thereto. For example, in another embodiment of the present disclosure (not shown), the area of each of the second conductive pads 13 can be different from the area of each of the conductive sheets, and the ring pattern can surround some or none of the second conductive pads 13.

It should be noted that during a manufacturing or use process, the solder material G applied to the conductive sheets (e.g., 121A, 121B, 121C in FIG. 4) will be in a liquid state (e.g., tin in a molten state), so as to carry the light emitting units 2. At this time, each of the light emitting units 2 will be confined by the solder material G (which is in the liquid state) on each of the conductive sheets and the second conductive pads 13, and each of the light emitting units 2 is subject to sliding and rotating due to movement of the solder material G that is in the liquid state. However, in the present disclosure, through the shape of the conductive sheets and a cohesive force of the solder material G, most of the solder material G will be confined within corresponding regions of the conductive sheets and the second conductive pads 13, so as to effectively control the sliding and rotating of each of the light emitting units 2. Preferably, each of the light emitting units 2 corresponds in position to one of the conductive sheets and one of the second conductive pads 13, and a spacing distance L3 between an edge of a projection region defined by orthogonally projecting the conductive sheet and the second conductive pad 13 on the substrate 11 and an edge of the light emitting unit 2 is within a range from 0 um to 100 um (as shown in FIG. 3).

Referring to FIG. 5, the third conductive pads 14 are disposed on the second board surface 112, and the third conductive pads 14 are spaced apart from each other. In addition, the third conductive pads 14 can be respectively and electrically coupled to the first conductive pad 12 and the second conductive pads 13 by a plurality of conductive columns 15 of the circuit board 1, so that certain ones of the third conductive pads 14 have the first polarity, and other ones of the third conductive pads 14 have the second polarity. Accordingly, the light emitting device 100 can be connected to other devices through the third conductive pads 14, so that the light emitting units 2 can be powered or controlled.

Preferably, areas of the third conductive pads 14 are identical to each other, and a total area of the third conductive pads 14 can be greater than 80% of an area of the second board surface 112, so that the third conductive pads 14 can increase the overall rigidity of the light emitting device 100, and can also improve a heat dissipation effect of the light emitting device 100, but the present disclosure is not limited thereto. For example, in another embodiment of the present disclosure (not shown), the areas of the third conductive pads 14 can also be different from each other, and the total area of the third conductive pads 14 is less than 80% of the area of the second board surface 112.

It should be noted that a spacing distance L3 between each of the third conductive pads 14 and an edge of the substrate 11 is preferably within a range from 0.025 mm to 0.1 mm.

Since the presence of metal burrs near a cutting edge can affect a soldering operation during a surface mount technology (SMT) assembly, the design of the spacing distance L3 can be adjusted in the manufacturing process of the light emitting device 100, so as to prevent the third conductive pads 14 to close to the cutting edge.

Moreover, in order to further ensure that the third conductive pads 14 do not experience electrical interference with each other (such as interconnection of different polarities), the light emitting device 100 also includes a plurality of barrier layers 3 that are not conductive (such as a solder resist). The barrier layers 3 are disposed on the second board surface 112, and each of the barrier layers 3 is located between any two adjacent ones of the third conductive pads 14. Preferably, areas of the barrier layers 3 can be identical to each other, which is beneficial for improving the production efficiency of the light emitting device 100. Naturally, the barrier layers 3 can be omitted according to practical requirements.

Referring to FIG. 3, the light emitting units 2 are disposed on the first board surface 111, and each of the light emitting units 2 is connected to the first conductive pad 12 and one of the second conductive pads 13. Preferably, the light emitting units 2 are each a rectangular structure, and a longitudinal axis of each of the light emitting units 2 is parallel to the symmetrical axis AL.

Furthermore, in order to ensure the brightness and uniformity of the light emitting device 100, a spacing distance L4 between any two adjacent ones of the light emitting units 2 is preferably less than 100 micrometers. Additionally, one of the light emitting units 2 disposed in a central region of the first board surface 111 can be designated to emit green light or have the highest luminous intensity. Taking the light emitting device 100 shown in FIG. 3 as an example, one of the light emitting units 2 disposed in the central region emits the green light, while the light emitting units 2 on two sides emit red and blue lights, respectively.

Figure 6:
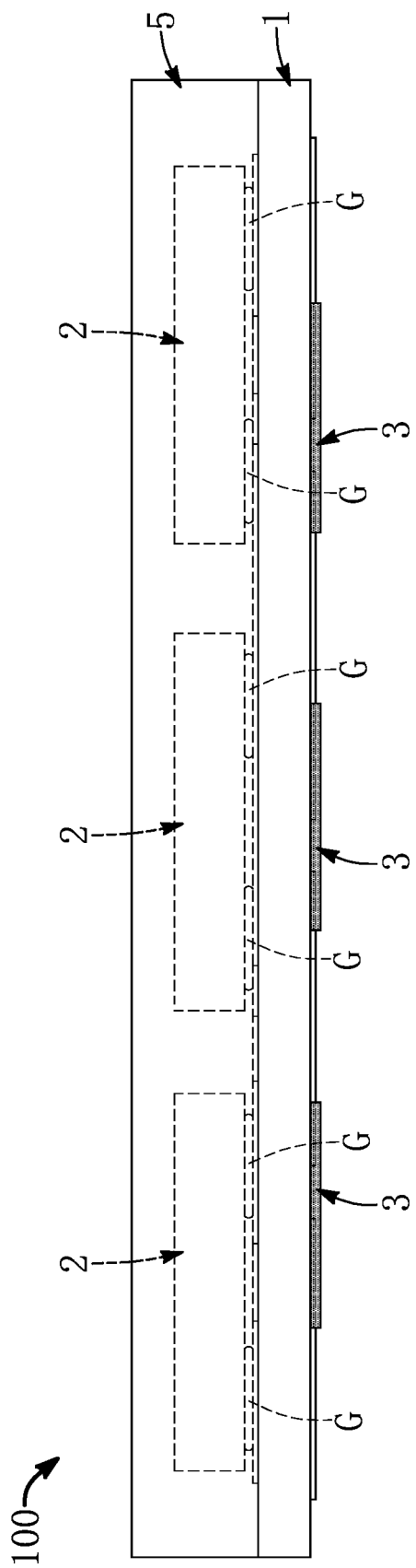
FIG. 6 is a schematic side view of the light emitting device according to the first embodiment of the present disclosure.

It should be noted that, as shown in FIG. 1 and FIG. 6, the light emitting device 100 in the present embodiment includes a diffusion layer 5. The diffusion layer 5 is disposed on the circuit board 1 and covers the light emitting units 2, but the present disclosure is not limited thereto.

Figure 7:
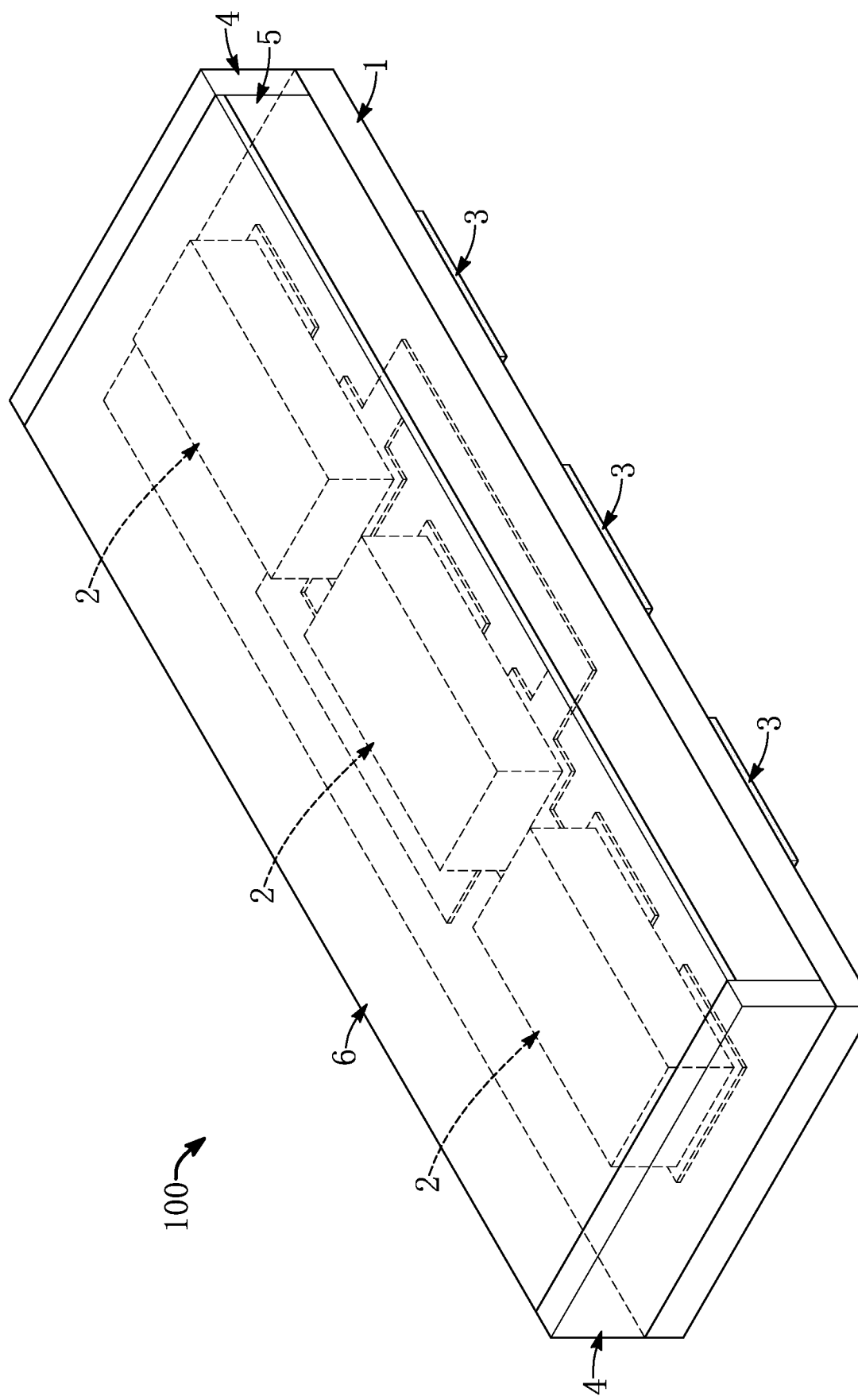
FIG. 7 is a schematic perspective view of another configuration of the light emitting device according to the first embodiment of the present disclosure.
Figure 8:
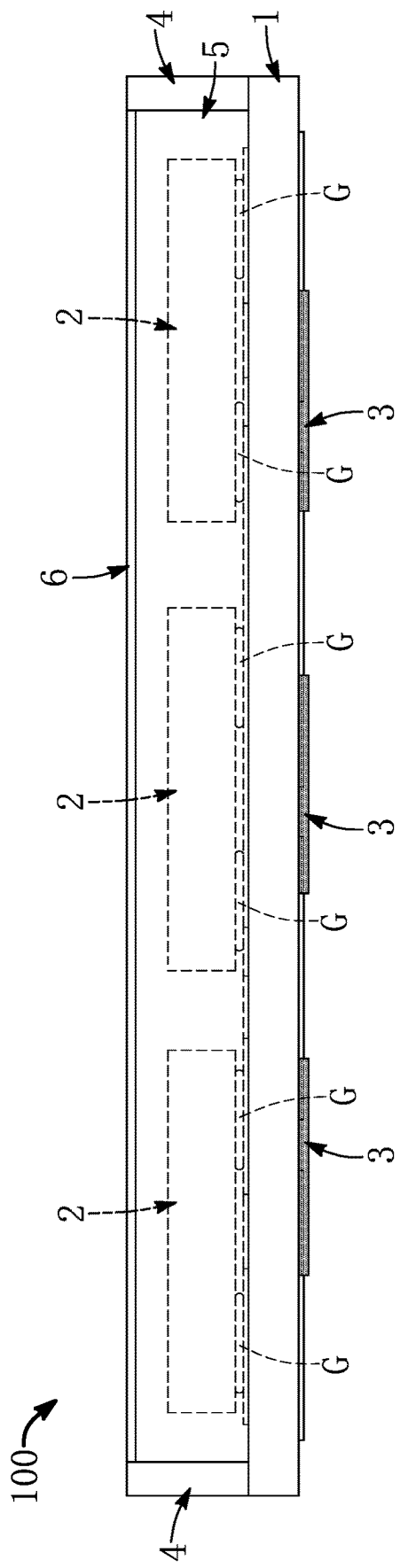
FIG. 8 is a schematic side view of another configuration of the light emitting device according to the first embodiment of the present disclosure.

For example, as shown in FIG. 7 and FIG. 8, another configuration of the light emitting device 100 further includes two light blocking walls 4 and a reflective layer 6. The two light blocking walls 4 are respectively disposed on two sides of the light emitting units 2, and each of the light blocking walls 4 is preferably parallel to the symmetrical axis AL, so that the light emitted from the light emitting units 2 can be concentrated through the two light blocking walls 4. Additionally, the diffusion layer 5 can be disposed on the first board surface 111 and cover the light emitting units 2, thereby diffusing the light emitted from the light emitting units 2 for improvement in uniformity. The reflective layer 6 covers the diffusion layer 5, so as to increase the brightness (and uniformity) by reflecting the light from the light emitting units 2. Naturally, either one of the two light blocking walls 4 or the reflective layer 6 can be omitted according to specific circumstances.

Second Embodiment

Figure 9:
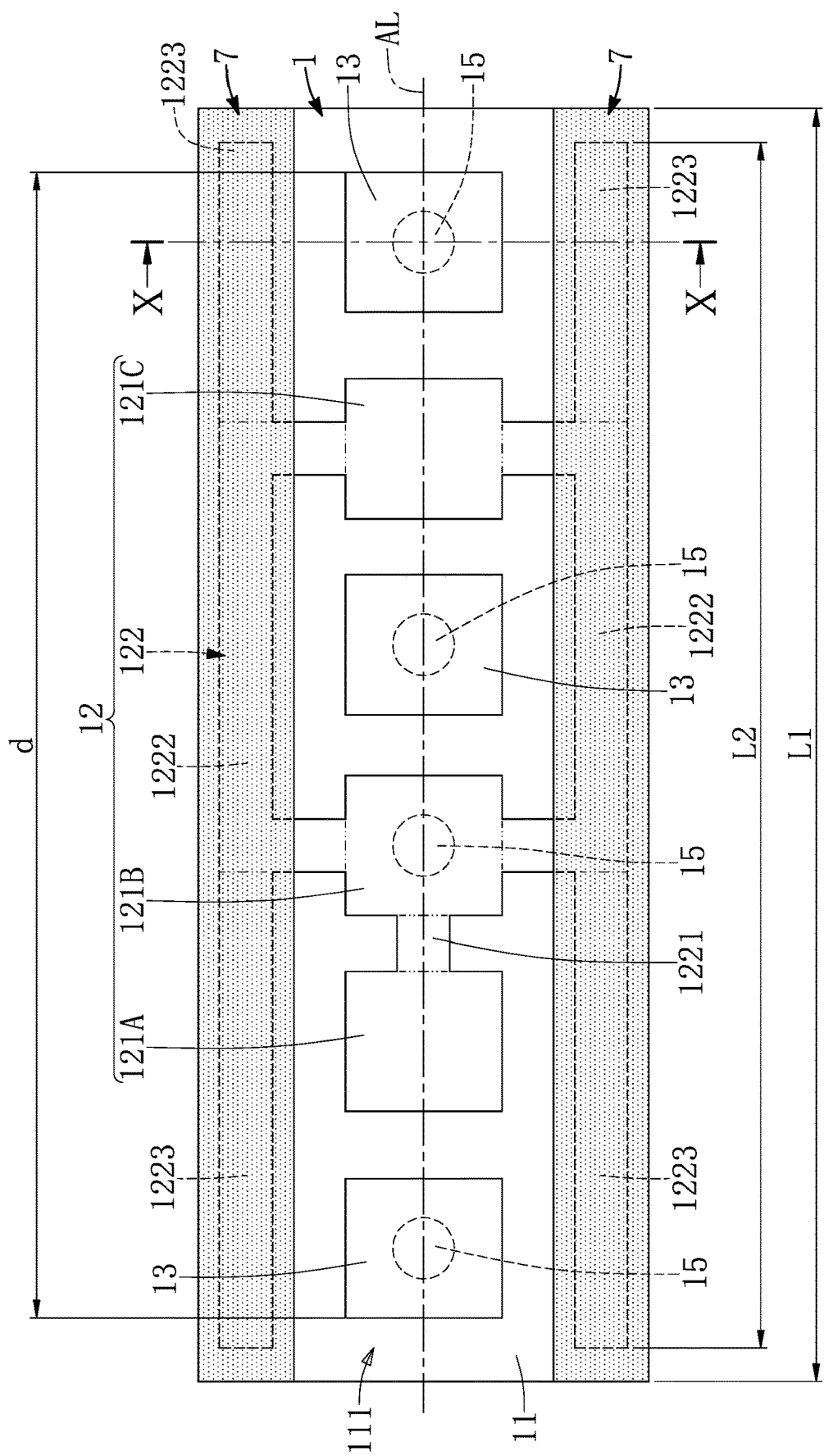
FIG. 9 is a schematic top view of the light emitting device according to a second embodiment of the present disclosure, with the light emitting units, the light blocking walls, the diffusion layer, and the reflective layer being omitted.
Figure 10:
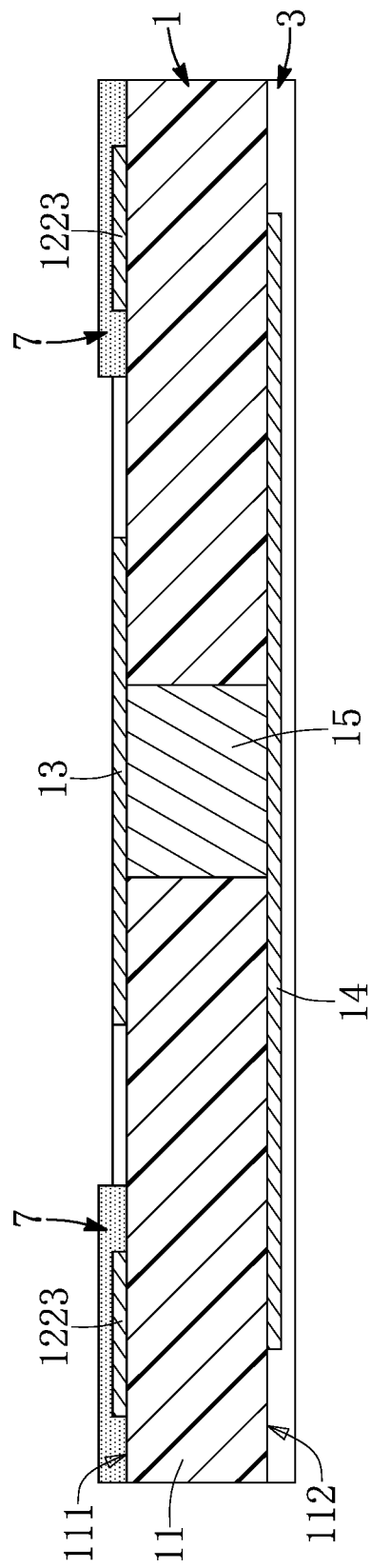
FIG. 10 is a schematic cross-sectional view taken along line X-X of FIG. 9.

Referring to FIG. 9 and FIG. 10, a second embodiment of the present disclosure provides a light emitting device. The present embodiment is similar to the first embodiment, and the similarities therebetween will not be repeated herein. The differences between the present embodiment and the first embodiment are mainly as follows.

The connecting circuit line 122 further includes two extension segments 1223 connected to each of the second connection segments 1222. Specifically, two ends of each of the second connection segments 1222 parallel to the symmetrical axis AL are respectively connected to the two extension segments 1223, and the two extension segments 1223 are also parallel to the symmetrical axis AL, so that each of the second connection segments 1222 and the two extension segments 1223 roughly form a 7C shape. That is to say, two side portions of the connecting circuit line 122 in the present embodiment are parallel to the symmetrical axis AL.

In addition, in a practical application, the light emitting device may further include two insulating layers 7, the two insulating layers 7 are disposed on two sides of the first board surface 111, and are symmetrical to the symmetrical axis AL, and the two insulating layers 7 cover a part of the first conductive pad 12. Taking the light emitting device shown in FIG. 7 and FIG. 8 as an example, the two insulating layers 7 are substantially parallel to the symmetrical axis AL, and the two insulating layers 7 cover the two side portions (i.e., a portion of each of the second connection segments 1222 parallel to the symmetrical axis AL and the two extension segments 1223). Heights of the two insulating layers 7 relative to the substrate 11 are identical to each other, which means that the heights of the two insulating layers 7 are identical to each other. Accordingly, during the manufacturing process of the two side portions, the two insulating layers 7 can effectively avoid being subject to adverse situations (e.g., preventing the solder material G that is in the liquid state from flowing along metal lines).

It should be noted that, as shown in FIG. 9, a length L1 of each of the two insulating layers 7 is preferably greater than or equal to a length L2 of each of the two side portions (i.e., a total length of a portion of each of the second connection segments 1222 parallel to the symmetrical axis AL and the two extension segments 1223), so as to prevent exposure of the two side portions caused by shifting of the two insulating layers 7. In addition, the length L2 of the two side portions can be greater than or equal to a farthest distance d between two of the second conductive pads 13 that are farthest from each other, so as to ensure that a height difference between the two side portions can be completely consistent (as shown in FIG. 10). Accordingly, this design can also ensure consistency in an amount of tin on the first conductive pad 12 and that on the second conductive pads 13.

Third Embodiment

Referring to FIG. 11 to FIG. 14, a third embodiment of the present disclosure provides a light emitting device. The light emitting device in the present embodiment shares the same inventive concept as the light emitting device 100 in the first embodiment. Specifically, the light emitting device in the present embodiment includes a circuit board 1' and a plurality of light emitting units 2' that are disposed on the circuit board 1'.

Figure 12:
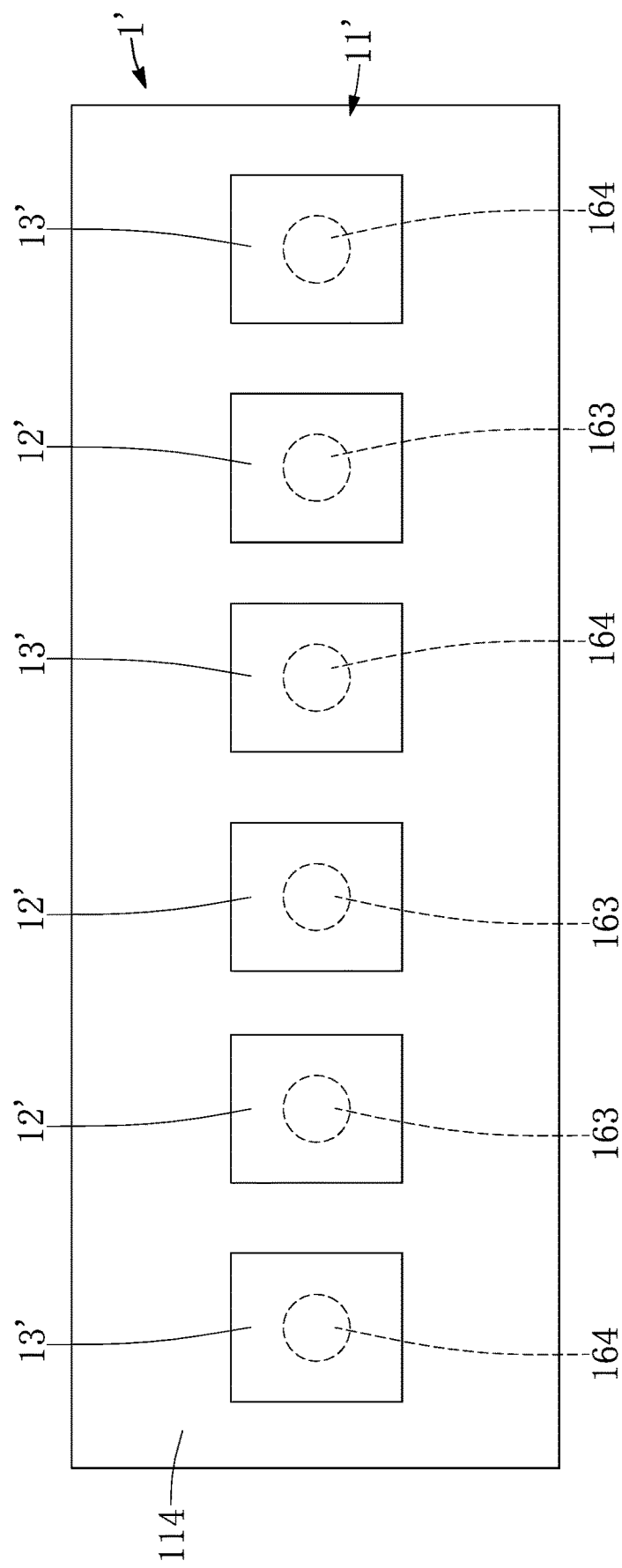
FIG. 12 is a schematic top view of the light emitting device according to the third embodiment of the present disclosure, with the light emitting units, the light blocking walls, the diffusion layer, and the reflective layer being omitted.
Figure 13:
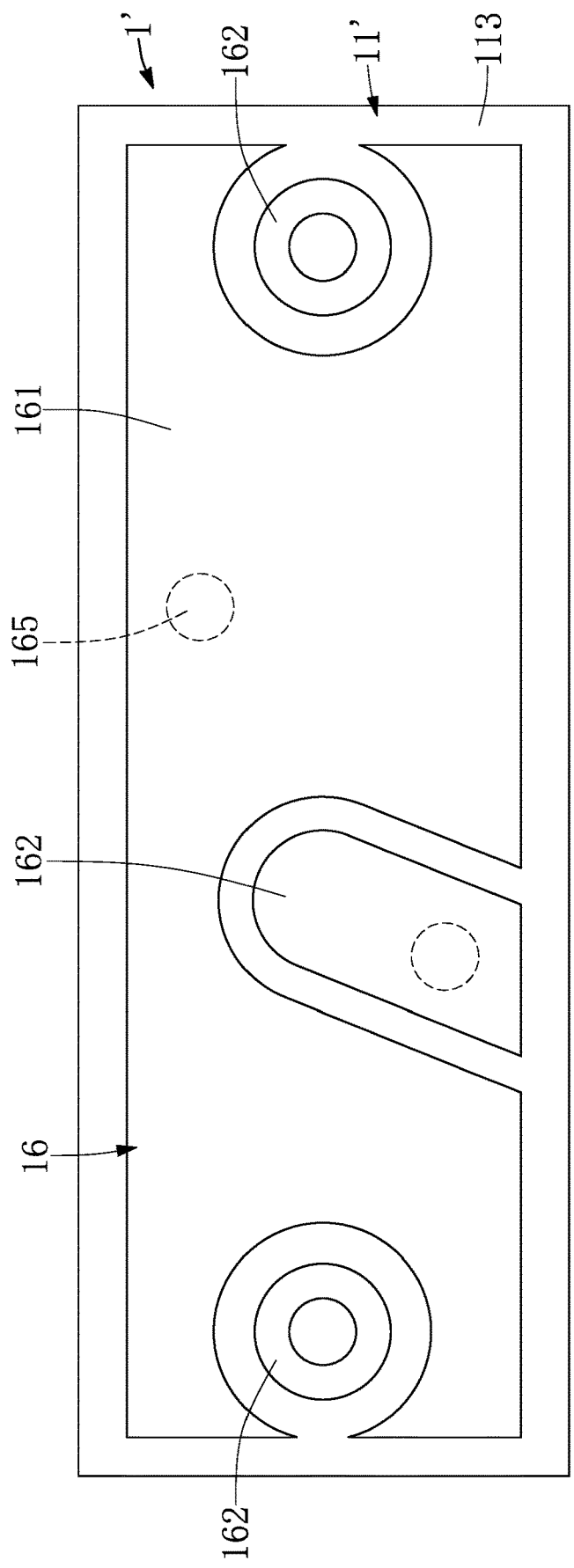
FIG. 13 is a schematic planar view of an interlayer and a conductive circuit of the light emitting device according to the third embodiment of the present disclosure.
Figure 14:
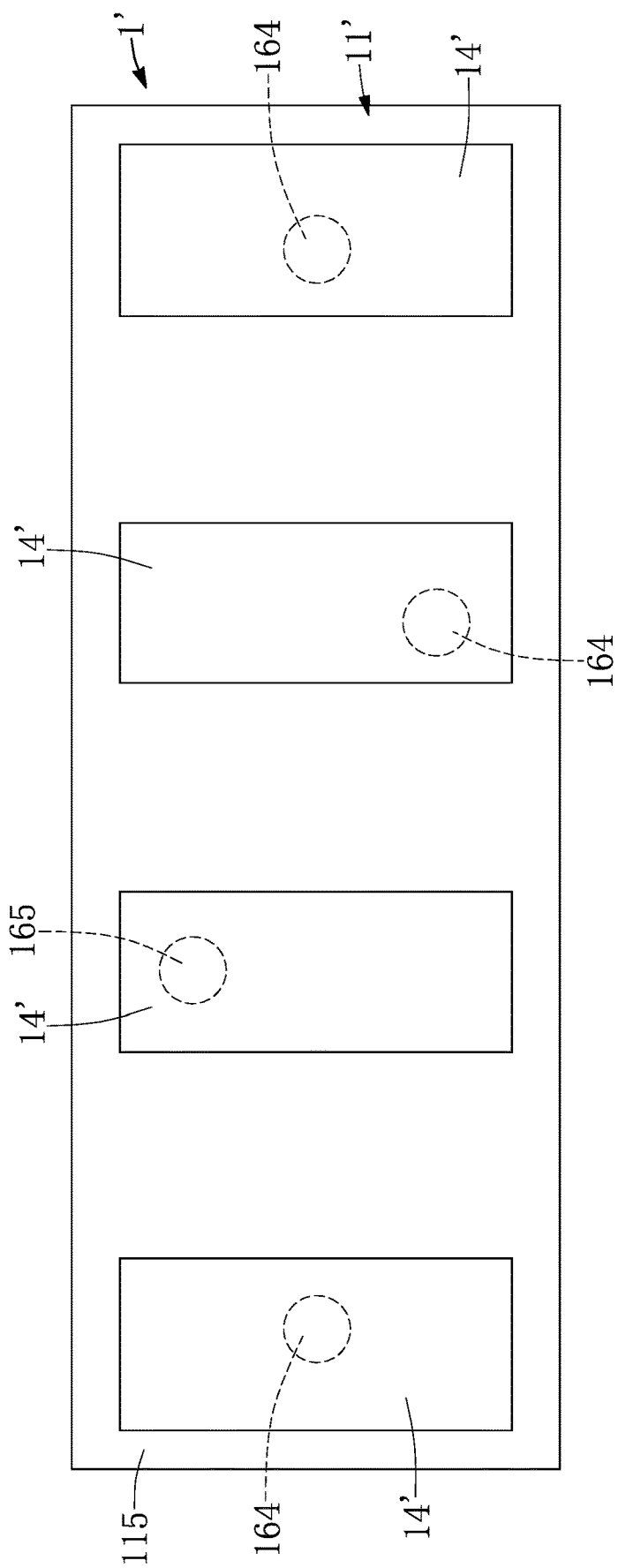
FIG. 14 is a schematic bottom view of the light emitting device according to the third embodiment of the present disclosure.

Referring to FIG. 12 to FIG. 14, the circuit board 1' includes a substrate 11', and a plurality of first conductive pads 12', a plurality of second conductive pads 13', a plurality of third conductive pads 14', and a conductive circuit 16 that are disposed on the substrate 11'. The substrate 11' in the present embodiment is a multi-layer structure, which includes an interlayer 113, and a first outer layer 114 and a second outer layer 115 that are disposed on opposite sides of the interlayer 113.

The first conductive pads 12' and the second conductive pads 13' are disposed on the first outer layer 114, and the first conductive pads 12' and the second conductive pads 13' are spaced apart from each other. Each of the first conductive pads 12' can provide a first polarity, and each of the second conductive pads 13' can provide a second polarity that is opposite to the first polarity. Preferably, each of the first conductive pads 12' and each of the second conductive pads 13' are rectangular, and an area of each of the first conductive pads 12' can be roughly equal to an area of each of the second conductive pads 13', but the present disclosure is not limited thereto.

Referring to FIG. 14, the third conductive pads 14' are disposed on the second outer layer 115, and are spaced apart from each other. The third conductive pads 14' can be electrically coupled to the first conductive pads 12' and the second conductive pads 13', so that one of the third conductive pads 14' has the first polarity, and the rest of the third conductive pads 14' have the second polarity. Accordingly, the light emitting device 100 can be connected to other devices through the third conductive pads 14', so that the light emitting units 2' can be powered or controlled.

Referring to FIG. 12 to FIG. 14, the conductive circuit 16 is disposed on the interlayer 113, and the conductive circuit 16 includes a first conductive pattern 161, a plurality of second conductive patterns 162, a plurality of first conductive columns 163, a plurality of second conductive columns 164, and an independent conductive column 165.

In the present embodiment, the first conductive pattern 161 roughly covers more than 70% of a side surface of the interlayer 113 facing the first outer layer 114, and the second conductive patterns 162 are arranged on the side surface of the interlayer 113 facing the first outer layer 114. In addition, the second conductive patterns 162 are spaced apart from each other and do not contact the first conductive pattern 161. A total area of the second conductive patterns 162 roughly covers more than 10% of an area of the side surface of the interlayer 113 facing the first outer layer 114. Accordingly, the first conductive pattern 161 and the second conductive patterns 162 can increase the overall rigidity of the substrate 11.

Referring to FIG. 12 to FIG. 14, the first conductive columns 163 are electrically coupled to the first conductive pads 12' and the first conductive pattern 161, and the independent conductive column 165 is electrically coupled to one of the third conductive pads 14' and the first conductive pattern 161, so that one of the third conductive pads 14' can be used as a connecting portion of the first polarity. In addition, the second conductive columns 164 are electrically coupled to the second conductive pads 13' and the rest of the third conductive pads 14', so that the rest of the third conductive pads 14' can be used as a connecting portion of the second polarity.

Figure 11:
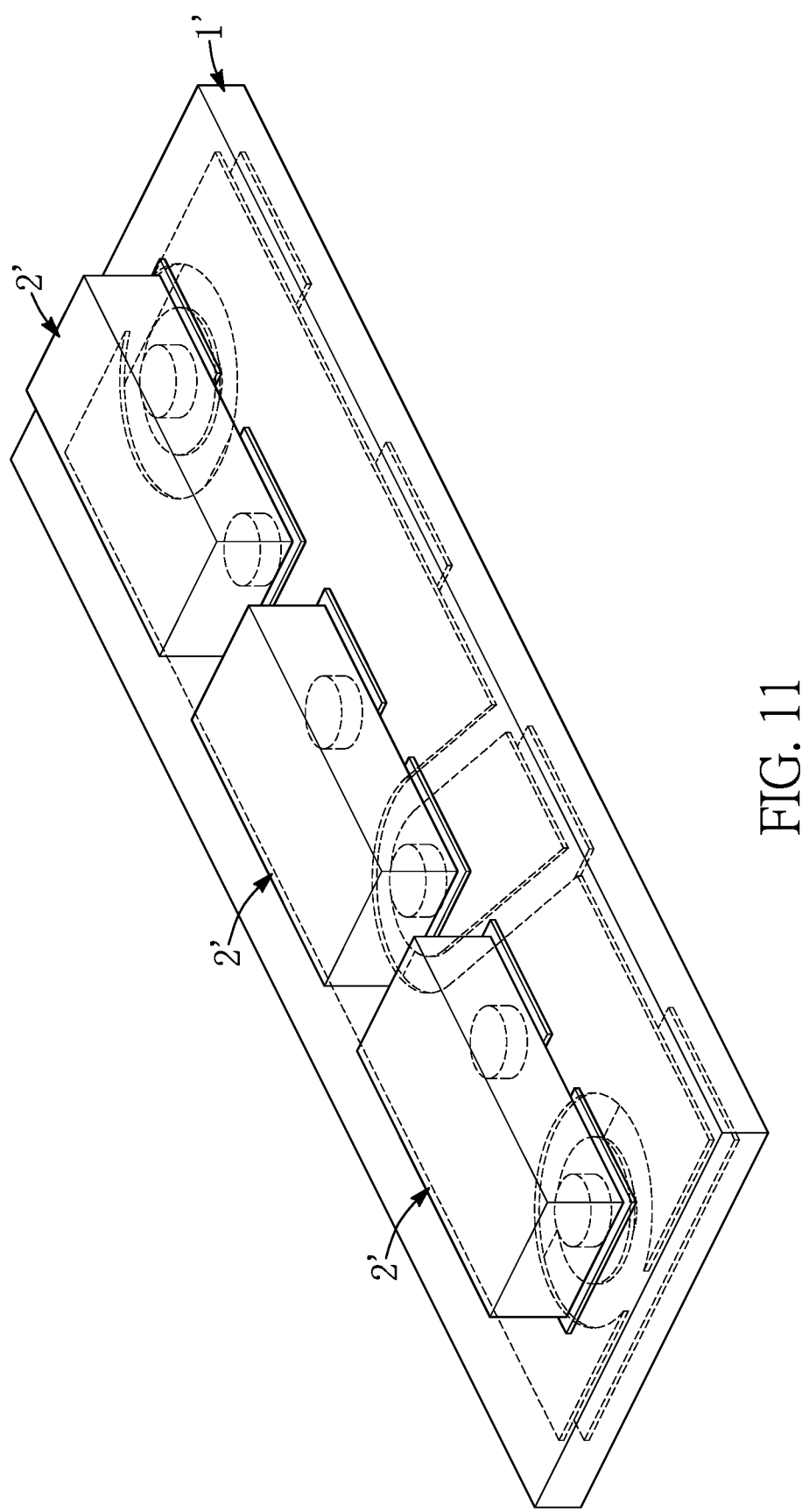
FIG. 11 is a schematic perspective view of the light emitting device according to a third embodiment of the present disclosure, with the light blocking walls, the diffusion layer, and the reflective layer being omitted.

Referring to FIG. 11, the light emitting units 2' are disposed on the first outer layer 114, and each of the light emitting units 2' is connected to one of the first conductive pads 12' and one of the second conductive pads 13'. In order to ensure the brightness and uniformity of the light emitting device 100, the light emitting units 2' in the present embodiment can be arranged in a manner similar to that of the light emitting units 2 in the first embodiment. For example, the major axes of the light emitting units 2' are parallel to a long edge of the substrate 11, and one of the light emitting units 2' located in a central region of the first outer layer 114 is designated to emit green light or the highest luminous intensity.

Fourth Embodiment

Figure 15:
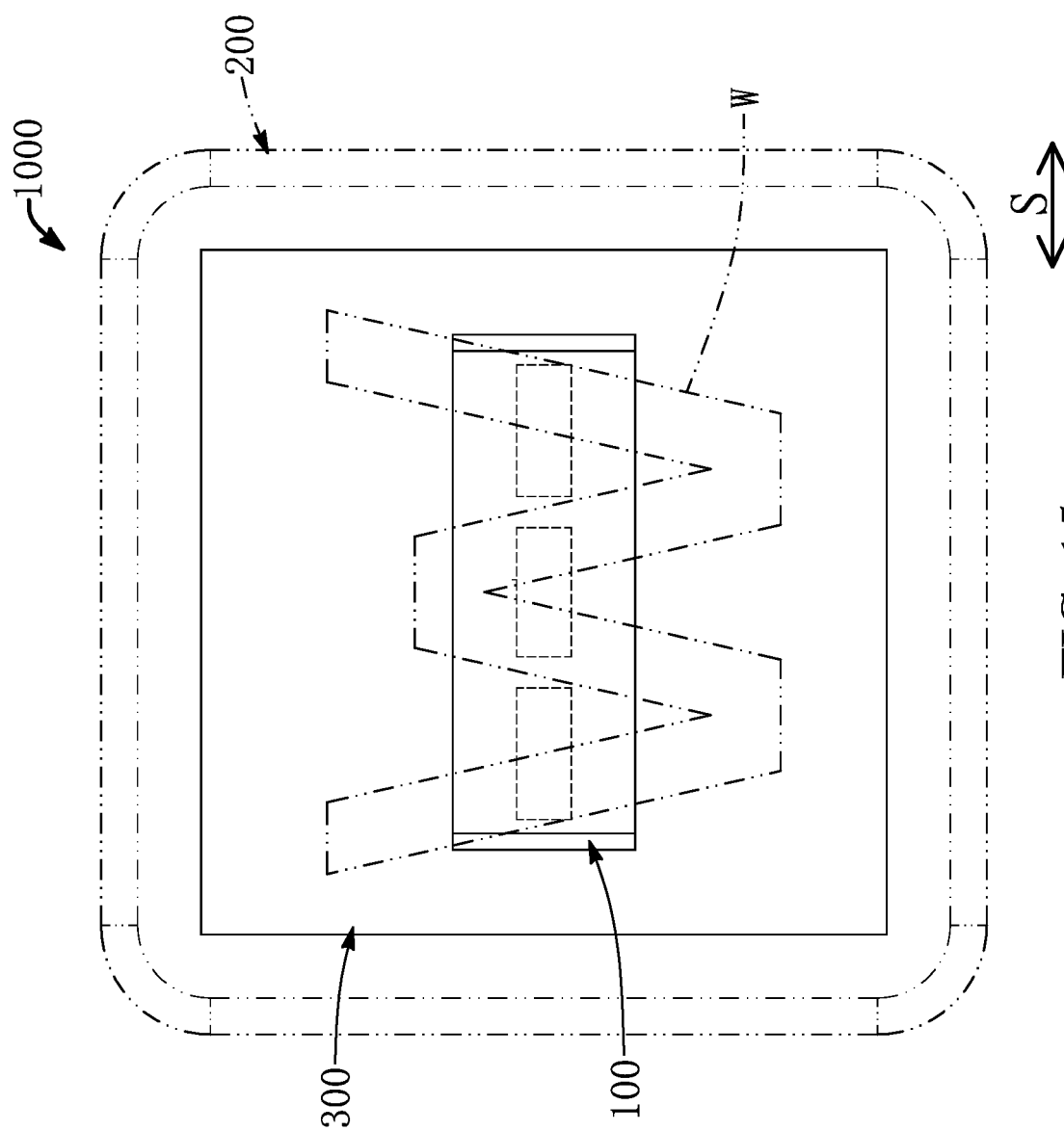
FIG. 15 is a schematic planar view of a keyboard structure according to a fourth embodiment of the present disclosure.

Referring to FIG. 15, a fourth embodiment of the present disclosure provides a keyboard structure 1000. The keyboard structure 1000 in the present embodiment includes the light emitting device 100 of the first embodiment, the second embodiment, or the third embodiment, a keycap 200 covering the light emitting device 100, and a carrier 300 that carries the light emitting device 100 and the keycap 200. The light emitting device 100 corresponds in position to a center of the keycap 200, and a longitudinal axis of the light emitting device 100 is parallel to a width direction S of a character W on the keycap 200. In other words, when a user uses the keyboard structure 1000, the longitudinal axis of the light emitting device 100 will be substantially parallel to an extension line between one eye and the other eye of the user.

It is worth noting that conventional keyboard structures often use square-shaped light emitting devices. However, the square-shaped light emitting devices exhibit poor performance in terms of a light emitting angle and color over angle (COA) uniformity when being emitted through a keycap (as shown in Table 1). In contrast, the keyboard structure 1000 of the present disclosure employs the structure of the light emitting device 100 as shown in FIG. 1. By designing the longitudinal axis of the light emitting device 100 (which is rectangular) to be parallel to the width direction S of the character W on the keycap 200, the light emitting angle and the color over angle (COA) uniformity of the light emitting device 100 that are emitted through the keycap are improved as compared to the conventional keyboard structures (as shown in Table 2).

The experimental procedure for measuring the color over angle (COA) uniformity is as follows. The light emitting device is fixed onto a rotating table that is placed in a completely dark environment, such as a dark box. A center position of the light emitting device faces the center of a receiver. The rotating table drives the light emitting device to rotate from −90 degrees to 90 degrees. The light emitting units (of red, blue, and green light) emit light simultaneously, and the emitted light is measured by the receiver. The receiver takes measurements of the data at 0 degrees and 90 degrees. The test for the color over angle (COA) uniformity is a common testing method in this field and is not the main focus of the present disclosure, and thus will not be specifically described herein.

TABLE 1

| | Square-shaped light emitting devices | | | | | | | |
| --- | --- | --- | --- | --- | --- | --- | --- | --- |
| | 0 degree viewing angle @20 mA | | | | 90 degree viewing angle @20 mA | | | |
| | Emission color | | | | | | | |
| | red | green | blue | yellow | red | green | blue | yellow |
| Angle | 115° | 122° | 121° | 119° | 114° | 125° | 124° | 120° |
| COA ± 80°@20 mA | 0 degrees | | | | 90 degrees | | | |
| | Δu'v'1 | | Δu'v'2 | | Δu'v'1 | | Δu'v'2 | |
| | 0.0103 | | 0.0129 | | 0.0608 | | 0.1049 | |

TABLE 2

| | Rectangular-shaped light emitting device | | | | | | | |
|---|---|---|---|---|---|---|---|---|
| | 0 degree viewing angle @20 mA | | | | 90 degree viewing angle @20 mA | | | |
| | Emission color | | | | | | | |
| | red | green | blue | yellow | red | green | blue | yellow |
| Angle COA ± 80°@20 mA | 147° | 152° | 130° | 143° | 127° | 129° | 122° | 126° |
| | 0 degrees | | | | 90 degrees | | | |
| | Δu'v'1 | | Δu'v'2 | | Δu'v'1 | | Δu'v'2 | |
| | 0.0059 | | 0.0051 | | 0.0149 | | 0.0004 | |

Beneficial Effects of the Embodiments

In conclusion, in the light emitting device and the keyboard structure provided by the present disclosure, by virtue of "the first conductive pad having a symmetrical shape and a symmetrical axis" and "the symmetrical axis passing through the second conductive pads, and the second conductive pads being spaced apart from the first conductive pad," the light emitting device and the keyboard structure can ensure an electrical relationship among the light emitting units, and the first conductive pad, the second conductive pads, and the third conductive pads connected, so as to improve product reliability.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A light emitting device, comprising:
  a circuit board including:
    a substrate having a first board surface and a second board surface opposite to each other;
    a first conductive pad disposed on the first board surface, wherein the first conductive pad has a symmetrical shape and a symmetrical axis;
    a plurality of second conductive pads disposed on the first board surface, wherein the symmetrical axis passes through the second conductive pads, and the second conductive pads are spaced apart from the first conductive pad; and
    a plurality of third conductive pads disposed on the second board surface, wherein the third conductive pads are electrically coupled to the first conductive pad and the second conductive pads respectively by a plurality of conductive columns; and
  a plurality of light emitting units disposed on the first board surface, wherein each of the light emitting units is connected to the first conductive pad and one of the second conductive pads.

2. The light emitting device according to claim 1, wherein a longitudinal axis of each of the light emitting units is parallel to the symmetrical axis.

3. The light emitting device according to claim 1, wherein the first conductive pad includes:
  a plurality of conductive sheets spaced apart from each other, wherein the symmetrical axis passes through the conductive sheets, and the conductive sheets are respectively connected to the light emitting units; and
  a connecting circuit line connected to the conductive sheets.

4. The light emitting device according to claim 3, wherein an area of each of the conductive sheets is equal to an area of each of the second conductive pads.

5. The light emitting device according to claim 3, wherein a part of the connecting circuit line has a ring pattern and surrounds one of the second conductive pads.

6. The light emitting device according to claim 1, further comprising two insulating layers, wherein the two insulating layers are disposed on two sides of the first board surface, and are symmetrical to the symmetrical axis, and the two insulating layers cover a part of the first conductive pad.

7. The light emitting device according to claim 5, further comprising two insulating layers that cover a part of the first conductive pad, wherein two of the second conductive pads farthest from each other have a farthest distance therebetween, two side portions of the connecting circuit line are parallel to the symmetrical axis, a length of each of the two side portions is greater than or equal to the farthest distance, and a length of each of the two insulating layers is greater than or equal to the length of each of the two side portions.

8. The light emitting device according to claim 6, wherein heights of the two insulating layers relative to the substrate are identical to each other.

9. The light emitting device according to claim 1, further comprising a diffusion layer disposed on the first board surface, wherein the diffusion layer covers the light emitting units.

10. The light emitting device according to claim 9, further comprising a reflective layer that covers the diffusion layer.

11. The light emitting device according to claim 1, further comprising two light blocking walls, wherein the two light blocking walls are respectively disposed on two sides of the light emitting units, and each of the two light blocking walls is parallel to the symmetrical axis.

12. A keyboard structure, comprising the light emitting device as claimed in claim 1, a keycap that covers the light emitting device, and a carrier that carries the light emitting device and the keycap, wherein the light emitting device corresponds in position to a center of the keycap, and a longitudinal axis of the light emitting device is parallel to a width direction of a character on the keycap.

* * * * *